United States Patent [19]

Malloy

[11] Patent Number: 4,954,180
[45] Date of Patent: Sep. 4, 1990

[54] METHOD FOR CLEANING SPINNERETTES

[75] Inventor: James C. Malloy, 404 W. Saratoga, Ferndale, Mich. 48220

[73] Assignee: James Christopher Malloy, Ferndale, Mich.

[21] Appl. No.: 204,595

[22] Filed: Jun. 9, 1988

Related U.S. Application Data

[63] Continuation-in-part of Ser. No. 50,008, May 15, 1987, abandoned.

[51] Int. Cl.$^5$ .............................................. B08B 3/10
[52] U.S. Cl. .............................. 134/22.13; 134/22.16; 134/22.17; 134/26; 134/29
[58] Field of Search ...................... 134/5, 22.13, 22.16, 134/22, 17, 26, 29, 30

[56] References Cited

FOREIGN PATENT DOCUMENTS

| 908953 | 2/1982 | U.S.S.R. ................................ 134/29 |
| 796770 | 6/1958 | United Kingdom .................... 134/5 |
| 965870 | 8/1964 | United Kingdom .................... 134/5 |

Primary Examiner—Asok Pal

[57] ABSTRACT

A process for cleaning organic material from the orifices of spinnerettes is disclosed. The spinnerettes are immersed in a fuse oxidizing salt bath between 500° F. and 900° F. The spinnerettes are placed with the orifices at an angle of 30° to 75° with respect to horizontal which will allow the escape of trapped gasses but prevent the settling of particles therein. The entrances of the orifices are oriented upwardly. The work pieces are treated until evidence of the reaction ceases, and are then quenched. In some cases a second treatment cycle may be necessary. The second treatment cycle may be at the same or higher temperature and in the same or a different salt. Vibration of the spinnerettes during the immersion is also desirable.

17 Claims, 1 Drawing Sheet

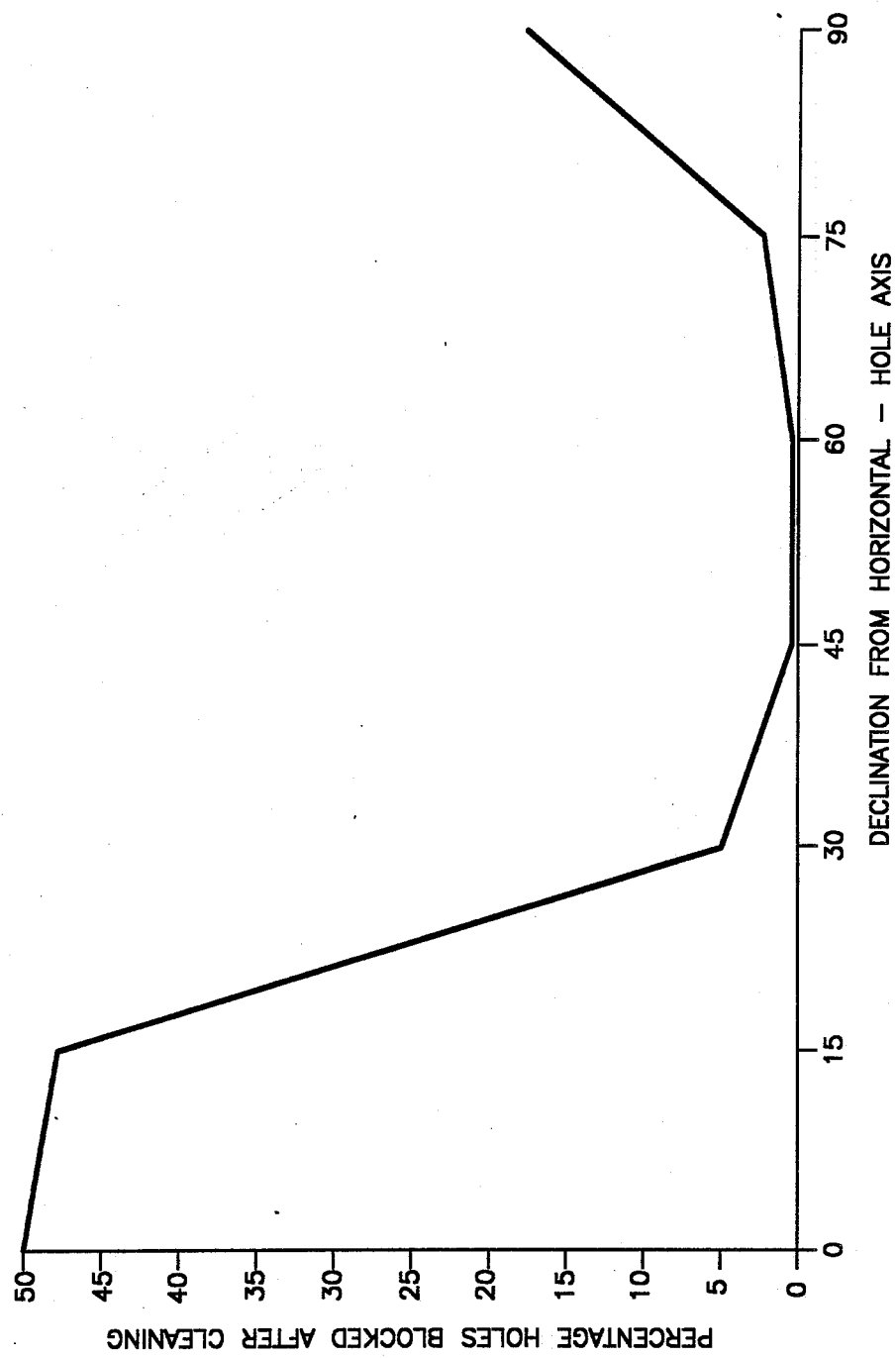

METHOD FOR CLEANING SPINNERETTES

This is a continuation-in-part of application Ser. No. 050,008 filed May 15, 1987, entitled Method and Apparatus for Cleaning Spinnerettes, now abandoned.

BACKGROUND OF THE INVENTION

This invention relates to a method of cleaning organic material from orifices in a work piece, and more particularly to cleaning organic polymeric material from the orifices of spinnerette plates used for the extrusion of such polymers into filaments.

DESCRIPTION OF THE PRIOR ART

In the extrusion of polymers into filaments through spinnerettes, after a period of time the polymer tends to adhere to and build up on the surfaces of the orifices and the surrounding surfaces. Once the build-up becomes significant it is necessary to remove the spinnerette from service, and clean away the built-up material. Since polymers normally contain fillers, such as titanium dioxide to increase opacity any removal process must address the problem of these fillers being removed as well as the removal of the base polymer. The cleaning process is somewhat complicated by the fact that the orifices are normally quite small (in some cases as small as 0.003" in diameter), and also the polymer tends to react and become very firmly adherent to the surface of the spinnerette material, which is conventionally stainless steel or other heat and chemical resistant alloy. Additionally, spinnerette holes are nromally not simple bored uniform holes, but may be shaped by counter-boring and/or chamfering. A spinnerette plate containing more than 1000 holes is not unusual. While extremely high temperatures, i.e. above about 1000 degrees F. may be effective to loosen and decompose the adhering polymer, nevertheless such temperatures normally must be avoided to prevent damage to the spinnerette as well as avoiding any undesirable change in the microstructure of the alloy. Further, due to the small size of the orifices, a purely mechanical process cannot usually effectively reach (the surfaces within) the orifices.

Prior art cleaning methods included incineration, chemical methods, high temperature salt baths, high pressure hydraulic energy, ultrasonics and combinations of these. All prior art methods were less than satisfactory in at least one respect. The incineration method is effective in destroying the polymer but residues remain in the extrusion holes and are very difficult to remove even with high pressure hydraulic methods. Further, elevated temperatures in the presence of an oxidizing media may cause attack to the metal (ordinarily a stainless steel of some type) which is used to make the spinnerette plate.

Prior art use of molten salt involved temperatures of about 900° F. in order to get adequate chemical activity. The salt is an oxidizing salt which assists in the destruction of the polymer but the primary cleaning activity is simply incineration. This operation is characterized by the generation of large volumes of smoke and flame at the surface of the salt bath where the polymer burns. Fume generation of this magnitude requires extensive fume collection and treatment facilities before the exhaust may be released to the atmosphere.

Another concern is the oxidation rate of the polymer at the fine tip of the spinnerette holes where local temperature generation can be much higher than the operating temperature of the salt bath. The high temperature generated by combustion of the polymer associated with the thin section at the sharp edges of the extrusion holes, damages the metal. The metallurgical damage which occurs at the tip of the spinnerette hole can be thermal softening or distortion of the sharp edge or it may be a chemical degradation due to oxidation of the metal or intergranular attack of the metal.

DESCRIPTION OF THE DRAWING

The single figure is a graph representing the degree of cleaning of spinnerette orifices at different angles from the horizontal.

DESCRIPTION OF THE PREFERRED EMBODIMENT(S)

The present invention is specifically adapted to clean organic polymers from the surfaces of the orifices in spinnerette plates which are used in the extrusion of polymeric filaments such as Nylon, Dacron or Orlon and the like. However, it may be used in any cleaning application where an adherent organic coating is to be removed from the surfaces of orifices of various metal work pieces, especially where the orifices are small, and/or have a large length to diameter ratio. Thus, the term spinnerette or spinnerette plate is intended to include any work pieces having orifices which may have organic matter adhering thereto and which organic material must be removed. The invention will be described however, in its preferred forms as it is used to clean spinnerettes used for extruding organic polymer fibers.

Briefly, the method comprises immersing the spinnerette plates into a relatively low temperature fused oxidizing salt bath and allowing the salt to react with the adhering organic material.

The selection of a speific fused salt may vary. However, it must be oxidizing to the organic material being removed to destroy the carbon rather than just char it; it must be liquid and sufficiently fluid at the operating temperatures (e.g. 500° F. to 900° F.); it should not have any adverse reaction with the filler material or the spinnerette and not creat any dangerous reaction conditions within the bath. An especially useful class of salts is the alkali metal hydroxides, preferably with the addition of alkali metal nitrates.

A particularly useful bath which has been used effectively is Kolene No. 6, a commercially available salt from Kolene Corporation of Detroit, Michigan. This salt has a composition of about 58.8% potassium hydroxide, about 40.3% sodium nitrate, and about 0.9% potassium permanganate as a catalyst. This salt has a melting point of about 385° F., has a low viscosity at 500° F. and above, and reacts strongly with organic polymers.

During oragnic destruction the reaction apparently is C (organic $+2NO_3^- \rightarrow CO_2 + 2 NO_2^-$. During idle periods the reaction is apparently $NO_2^- + \frac{1}{2}O_2$ (air)$\rightarrow NO_3^-$.

For the best results, the plates should be positioned with the axes of the orifices extending at an angle of between 30° and 75° to the horizontal. The orifices normally have enlarged inlet ends, and these inlet ends should be oriented upwardly. The positioning of the axes at an angle and orientation of the inlet ends are necessary to allow for the free passage of gases generated out of the orifices, and yet prevent solid particles from settling into the orifices and block passage of the salt. Generally speaking, an angle between 30° and 75° with the horizontal is preferable, with best results obtained with an angle of between 45° and 60° angle. Also, for best results, the parts should be agitated or vibrated while in the bath. This reduces the tendency of the gases generated to adhere to the orifice walls. Commercial vibrators, such as Vibroller vibrators sold by Martin Engineering Company of Neponset, Illinois, may be used. The time of immersion varies but is is typically about 15 minutes to one hour. The treatment should be about 500° F. to 700° F. The 500° F. is slightly above the flow point of most polymers. This will cause a relatively slow reaction rate with the softened polymer and thus minimize local heating which will result in a minimum of char residue. A rinse in a acid bath such as Kolene KGC which comprises equal parts of citric acid and sodium gluconate with about 5% tartaric acid maintained at 150° F. helps brighten the spinnerette and assists in removing any residue. The spinnerette plates are removed from the salt bath, preferably quenched in hot water, and may be subjected to a high pressure water spray or to a vibratory polishing treatment. In some cases this sequence will remove a great deal but not all of the adhering material. In such cases, the entire sequence is repeated. The quenching and acid treatment expose fresh surfaces of the unreacted polymer still adhering to the walls, and thus the second immersion into the salt bath will cause further reaction. When the reaction ceases, the spinnerette is removed, quenched and acid treated. In some cases where the polymeric material is especially adherent and/or the orifices especially small it may be desirable to increase the temperature somewhat for the second immersion treatment. For example, the first treatment is the salt bath should be at about 500° F. and the second can have the temperature increased up to 750° F. or even slightly higher although it should not exceed about 900° F. However, the time should be somewhat shorter if the temperature is raised, but this will generally be the case since there is not much organic material left after the first immersion. Also, it may be desirable to use a different, more aggressive salt, such as DGS, a salt made by Kolene Corporation of Detroit, Michigan, and having a composition of about which is composed of about 15% sodium nitrate, 10% sodium chloride 12% potassium hydroxide, balance sodium hydroxide. In extreme cases this sequence of steps may have to be repeated a third time to assure complete removal of the organic material. While all of the various steps are desirable in some instances, the critical steps are the immersion in the fused oxidizing salt bath until evidence of a reaction, e.g. generation of gas bubbles or the appearance of polymer particles on the surface, has started and then eventually ceases, followed by quenching. Also the angle and orientation to allow escape of trapped gases but prevent settling of particles in the orifices is critical.

Listed below are some typical examples of the process of removing organic residue from spinnerettes.

Sample Description: 2 rectangular spinnerettes w/solidified polymer residues

| | |
|---|---|
| (1) Kolene No. 6 @ 650° F. | 30 minutes |
| (2) Postcool in air | 15 minutes |
| (3) Quench in hot water/soak | 15 minutes |
| (4) Fresh water rinse/air dry. | |

Results: 90+% of polymer removed, small amount remained in bottom of some counterbores.

Spinnerettes were recylced Steps (1) through (4) above. Polymer appears to have been completely removed. One spinnerette of the two processed as outlined above was brightened with Kolene "KGC" organic acid:

| | |
|---|---|
| (1) 5% solution "KGC" @ 140 F. | 5 minutes |
| (2) Fresh water rinse/air dry. | |

Comments

Very little smoke was generated during the cleaning of these components. Reaction "peaked" at ca. T=10 minutes with moderate amount of partially digested polymer "blanketting" the surface of the molten salt. It was during this phase of cleaning that the small amount of smoke was observed. As the polymer continued to be digested by the bath and the "blanket" dimenished smoke generation ceased. The balance of the cleaning cycle was unremarkable, with sporadic gentle gassing observed as the salt scavenged polymer residue from deep in the counterbores/capillaries.

EXAMPLE II

Sample description:

One spinnerette with solidified Nylon 66

| | | |
|---|---|---|
| Weight before | 4360 | gms |
| Weight after | 4283 | gms |
| Weight removed | 77 | gms |

Cleaning cycle consisted of the following:

| | |
|---|---|
| Kolene No. 6 @ 575 F. | 30 minutes |
| Postcool/still air | 5 minutes |
| (temp of part = 420 F.) | |
| Soak in hot water (ca. 160 F.) | 5 minutes |

Examination of part showed that only about 50% of the spinnerette holes were open. Part was rinsed with fresh water and passages dried with compressed air. Processing continued as outlined below with same parts:

| | |
|---|---|
| Kolene No. 6 @ 625 F. | 10 minutes |
| Postcool/still air | 5 minutes |
| Quench in abient temp water | 1 minute |
| Soak in hot water (ca. 160 F.) | 5 minutes |

Spinnerette was completely cleaned after this processing.

EXAMPLE III

One spinnerette, Kolene No. 6 @675° F.

| | |
|---|---|
| Kolene No. 6 @ 675 F. | 45 minutes |
| Postcool in still air | 5 minutes |
| Quench in ambient temp water | 1 minute |
| Soak in hot water | 5 minutes |

Examination showed that the part was essentially clean with the exception of three (3) passages which appeared to be blocked with residue.

EXAMPLE IV

One spinnerette with "heavy" polyester residue . . . spinnerette had not been scraped of excess residue.

| (1) Kolene No. 6 @ 650 F. | 15 minutes |
| (2) Direct ambient temp water quench | 2 minutes |
| (3) Kolene "KGC" organic acid @ 150 F. | 5 minutes |
| (4) Fresh water rinse/force dry | |

Results: Spinnerette had bright, metallic appearance.

Examination showed approximately 20 holes still had residue present. Some of this residue had the appearance of unreacted polymer, while other other had dark, "carbonaceous" appearance.

| (5) Kolene No. 6 @ 675 F. | 15 minutes |
| (6) Direct ambient temp water quench | 2 minutes |
| (7) Kolene "KGC" organic acid @ 150 F. | 5 minutes |
| (8) Fresh water rinse/force dry | |

Results: Spinnerette had same appearance as after step (4) above. Approximately 4 holes had loosely adherent residue. About 250 grms. of polymer removed.

EXAMPLE V

One spinnerette with "light" polyester polymer residue

Processed as outlined in Example IV above, except temperature of the Kolene No. 6 salt was 700° F. Results were marginally better, with only one holed having small amount of residue. Total weight of polymer removed was approximately 125 grams or 0.25 lbs.

EXAMPLES VI

One spinnerette with "light" polymer residue

Processed as outlines in Example IV steps (1) through (4). Examination showed residue. Spinnerette was then immersed in Kolene DGS molten salt @800° F. for a period of 15 minutes. It was then water quenched, pickled in the "KGC" solution, water rinsed and dried.

Results: Spinnerette was bright, metallic in appearance after salt bath cleaning and pickled in the "KGC" acid solution. Three holes had loosely adherent residue upon examination after this treatment.

EXAMPLE VII

Staple annular spinnerette

| Kolene No. 6 @ 600 F. | 5 minutes |
| Postcool in still air | 1 minute |
| Ambient temp water quench | 30 seconds |
| Hot water rinse | 2 minutes |

Results: Polymer completely removed. Component had dark charcoal/black appearance, possibly due to prior cleaning methods. Approximately 2.5 grams of polymer was removed.

EXAMPLE VIII

Rectangular spinnerette plate with polyester polymer residue.

| Kolene No. 6 @ 600 F. | 10 minutes |
| Postcool in still air | 2 minutes |
| Ambient temp water quench | 30 seconds |
| Hot water rinse | 2 minutes |
| 10% "KGC" pickling compound @ 150° F. | 5 minutes |
| Final water rinse/air dry. | |

Results: Polymer removed from "central" capillaries; circumferential capillaries still had some polymer residue. Bath-induced oxidation completely removed and component was bright metallic.

Above cycle repeated. Additional polymer removed, but still had small amount of residual polymer in circumferential capillaries. Bath temperature was raised to 650° F. and spinnerette re-immersed for 5 minutes; balance of cycle as outlined above. All polymer was removed and spinnerette had bright metallic appearance.

EXAMPLE IX

Sample description 5 pcs stainless steel spinnerettes
1 pc breaker plate
1 pc "diffuser" plate Summary of Sample Processing Initial tests were performed with Kolene No. 6 molten salt in the temperature range of 600°-650° F. Immersion times ranged from ca. 30 minutes to 60 minutes. Following salt bath cleaning, components were quenched/rinsed in ambient temperature water and then briefly soaked in hot water (temp=ca. 160° F.) for approximately 5 minutes to remove any solidified salt residues.

Cleaning results were comparable to those achieved in Examples IV, V, VI, i.e, approximately 90-95 % of the holes were completely clean, while the balance had residual polymer/char after the first cycle. The four smaller diameter spinnerettes, along with a larger, thicker spinnerette were then processed in Kolene No. 6 a second time, using the same conditions as the first time, but with the addition of vibratory action during the processing steps. Results were essentially 100% cleaning.

Discussion of the examples

Example I is typical of a spinnerette having average sized and spaced orifices with average length and width ratios. A single treatment removes most but not all of the polymer, and a second treatment in the same salt removes all of the remaining polymer.

Example II is similar to Example I but shows how slightly varying the temperature of the bath during the second cycle can reduce the time of immersion.

Example III shows the use on a spinnerette that has rather large orifices with relatively low length to diameter ratios, however, even in this case there was still some residue in a few orifices.

Example IV through VI show how varying certain conditions improves the effectiveness of the process. In Example IV the first temperature was 650° F. and the second 675° F. Even after both cycles there was considerable residue. In Example V the temperature of the bath was raised to 700° F. and significant improvement was obtained but still one orifice had residue. In Example VI, the second bath was DGS salt rather than the Kolene 6. The DGS is a little more aggressive and at the 800° F. temperature the orificies were complete cleaned.

Example VII shows the case of spinnerettes which have very large orifices with quite low length to diameter ratios. In this case, a single treatment removed all of the polymer.

Example VIII is an example of a spinnerette wherein the inner or central orifices have a smaller length to diameter ratio than the outer orifices. In this case, the first cycle removed all of the polymer from the inner orifices, but a residue remained in the outer orifices. A second cycle removed most of the residue, but in this case a third cycle was needed to completely clean all of the orifices.

Example IX shows vibration utilized to aid the process. The orifices had high length to diameter ratios, and predictably a second cycle might not have been entirely effective. However, with vibration they were cleaned completely.

Examples IV through IX also show the use of an acid rinse (KGC) to help remove loose residue.

To demonstrate the effect of different angles of inclination of the holes during processing, several tests were run to clean clogged holes of spinnerettes. The spinnerettes were formed of 17-4 PH steel and had 420 holes which were about 0.025 inches in diameter and about 0.06 inches long.

In each case polyester pellets were placed on a cold spinnerette wherein the holes were completely free and unblocked. The spinnerette was placed in an oven at 300° C., for 45 minutes to allow the polymer to melt into and fill the holes. The spinnerette was removed from the oven and allowed to cool for 30 minutes. In each test the spinnerettes were treated in an identical manner except for the angle of inclination of the holes: i.e. They were placed in a Kolene 6 salt bath for 10 minutes at 650° F.

Each was then quenched in ambient water, and then cleaned in KGC acid to brighten the surface, followed by a water rinse. The angles of the holes, with respect to the horizontal and the amount of cleaning is as follows:

| EX-AMPLE | ORIENTATION OF HOLES WITH RESPECT TO HORIZONTAL | % OF HOLES BLOCKED AFTER TREATMENT |
|---|---|---|
| X | Horizontal | 50% |
| XI | 15° Large end up | 48% |
| XII | 30° Large end up | 5% |
| XIII | 45° Large end up | 0.5% |
| XIV | 60° Large end up | 0.5% |
| XV | 75° Large end up | 3% |
| XVI | Vertical Large end up | 19% |
| XVII | Vertical Large end down | 18% |
| XVIII | 45° Large end down | 20% |

The test results from tests X through XVI are shown graphically in the single figure. It is clear that the optimum angles are from 45° to 60°, with angles of 30° to 75° also working quite well. Also in this range it is clear that the large end should be oriented upwardly.

While the effect of the orientation of the orifices, or holes, is not completely understood, it is believed that by keeping them at an angle, with the large end up, gas is allowed to escape from the top and is not trapped and fused salt can also enter without being blocked by trapped gas.

What is claimed:

1. A method of cleaning organic material from the orifices of spinnerettes comprising the steps of:
   immersing the spinnerette in a fused oxidizing salt bath maintained between about 500° F. and 900° F., positioning the spinnerette in a position with the orifices extending at an angle of from about 30° to about 75° with respect to the horizontal to allow trapped gases to escape, and with the inlet ends of the orifices oriented upwardly;
   removing the spinnerette from the bath, and
   quenching the spinnerette.

2. The method as defined in claim 1 wherein the angle of the orifices is between about 45° and about 60° with the horizontal.

3. The method as defined in claim 1 including the additional steps of first immersing the spinnerette at least one additional time in a fused oxidizing salt bath maintained between 500° F. and 900° F., positioning the spinnerette in a position with orifices extending at an angle to allow trapped gases to escape and prevent particles from settling in the orifices and with the inlet ends of the orifices oriented upwardly;
   maintaining the spinnerettes in the bath each additional time until any observed reaction evidence essentially ceases;
   removing the spinnerette from the bath.

4. The method as defined in claim 1 wherein the bath is mainted at between 500° F. and 700° F.

5. The method as defined in claim 4 wherein the bath includes an alkali metal nitrate.

6. The method as defined in claim 5 wherein the bath is comprised of about 58.8% potassium hydroxide, about 40.3% sodium nitrate and about 0.9% potassium permanganate.

7. The method as defined in claim 1 wherein the spinnerette is vibrated during the salt bath treatment.

8. The method as defined in claim 3 wherein the second bath is maintained at a higher temperature than the first bath.

9. The method as defined in claim 8 wherein the first bath is maintained between about 500° F. and 700° F. and the second bath is maintained between 700° F. and 900° F.

10. The method as defined in claim 3 wherein the baths include alkali metal nitrates.

11. The method as defined in claim 9 wherein the first bath is comprised of potassium hydroxide and sodium nitrate, and the second bath is comprised of sodium nitrate, sodium hydroxide and sodium chloride, and potassium hydroxide.

12. The method as defined in claim 10 wherein at least the first bath is comprised of potassium hydroxide and sodium nitrate.

13. The method as defined in claim 12 wherein at least the first bath is comprised of about 58.8% potassium hydroxide, about 40.3% sodium nitrate, and about 0.9% potassium permanganate.

14. The method as defined in claim 11 where the first bath is comprised of about 58.8% potassium hydroxide, about 40.3% sodium nitrate and about 0.9% potassium permanganate, and the second bath is comprised of about 15% sodium nitrate, about 10% sodium chloride, and about 12% potassium hydroxide and balance sodium hydroxide.

15. The method as defined in claim 3 wherein the spinnerette is vibrated during at least one of the bath immersion cycles.

16. The method as defined in claim 1 wherein the spinnerette is rinsed in an organic acid dip after quench.

17. The method as defined in claim 3 wherein the spinnerette is rinsed in an organic acid following at least the quench after second salt bath immersion.

* * * * *

UNITED STATES PATENT AND TRADEMARK OFFICE
CERTIFICATE OF CORRECTION

PATENT NO. : 4,954,180

DATED : September 4, 1990

INVENTOR(S) : James C. Malloy

It is certified that error appears in the above-identified patent and that said Letters Patent is hereby corrected as shown below:

On the title page, in item [73], the Assignee should be --Kolene Corporation, Detroit, Michigan--.

Signed and Sealed this

Seventeenth Day of March, 1992

Attest:

HARRY F. MANBECK, JR.

*Attesting Officer*  *Commissioner of Patents and Trademarks*